(No Model.)
U., F. L. & H. E. EBERHARDT.
ROTARY CUTTER FOR MAKING SIMILAR TEETH.
No. 496,511. Patented May 2, 1893.
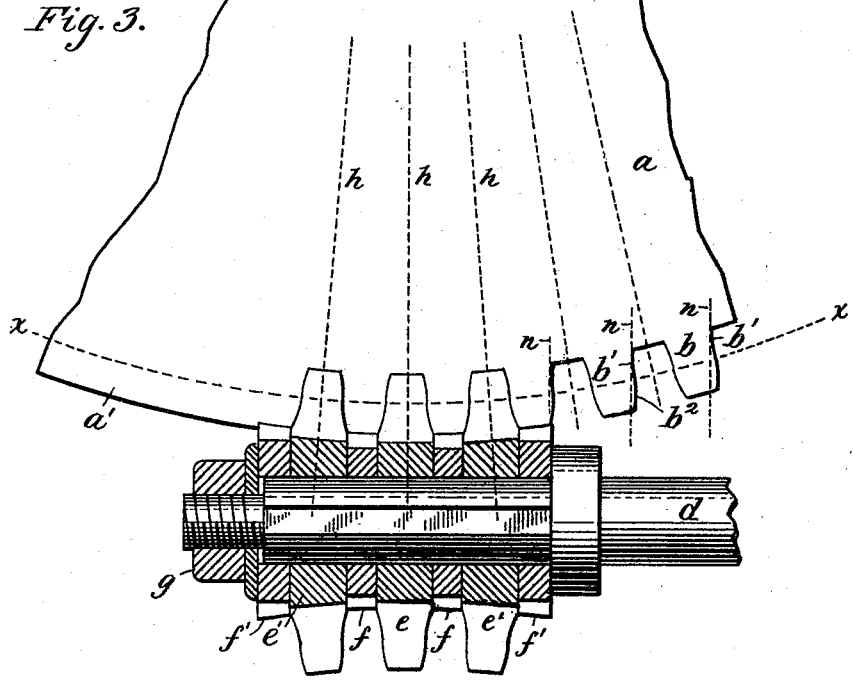

UNITED STATES PATENT OFFICE.

ULRICH EBERHARDT, FRED L. EBERHARDT, AND HENRY E. EBERHARDT, OF NEWARK, NEW JERSEY.

ROTARY CUTTER FOR MAKING SIMILAR TEETH.

SPECIFICATION forming part of Letters Patent No. 496,511, dated May 2, 1893.

Application filed April 1, 1892. Serial No. 427,345. (No model.)

*To all whom it may concern:*

Be it known that we, ULRICH EBERHARDT, FRED L. EBERHARDT, and HENRY E. EBERHARDT, citizens of the United States, all residing at Newark, Essex county, New Jersey, have invented certain new and useful Improvements in Rotary Cutters for Making Similar Teeth, fully described and represented in the following specification and the accompanying drawings, forming a part of the same.

The object of this invention is to furnish means for cutting several teeth simultaneously in circular gear blanks. To accomplish this object we combine with the same spindle a series of annular cutters having similar cutting faces all inclined in the same direction and at the same angle to the periphery of the blank. The series of cutters can be formed in one piece, but we prefer to form them separately to facilitate their manufacture, and we also prefer when using the cutters to form spur gears for transmitting motion, to insert between the cutters intermediate disks having cutting teeth upon their edges, which serve as topping-cutters to shape the tops of the gear-teeth, and thus save the expense of turning off the rim of the blank.

The invention will be understood by reference to the annexed drawings, in which—

Figure 1 is a diagram showing a portion of a circular blank with five teeth cut therein, and a spindle having a gang of cutters shown in contact with the teeth, the cutters being in section where hatched. Fig. 2 is an edge view, and Fig. 3 a side view of one of the oblique or lateral cutters. Fig. 4 is an edge view, and Fig. 5 a side view of one of the topping-cutters from the end of the gang.

$a$ represents the blank, $b$ the teeth formed thereon, and $c$ the spaces between the teeth. $d$ is the cutter spindle, $e$ the central cutter of the gang, and $e'$ lateral shaping cutters having similar cutting faces.

$f$ are two topping cutters inserted between the three cutters $e$, $e'$, $e'$; and $f'$ are the topping-cutters at the ends of the gang; the whole being secured upon the spindle by a nut $g$. Five spaces are shown cut in the blank, forming five teeth; leaving an uncut portion of the blank, $a'$. The pitch circle of the teeth is indicated by the dotted line $x, x$, and dotted lines $h$ are drawn at right angles to such pitch circle through the centers of the spaces $c$, such lines converging to the center of the blank, which is designated by the circle $i$ within the arbor $j$, upon which the gear is secured to cut the teeth. The opposite sides of the cutter $e$ are in all respects similar, as the line $h$ which intersects the center of its thickness is at right angles to the spindle $d$; but the cutters $e'$ and $e'$, although provided with symmetrical cutting faces, are dissimilar upon their opposite sides, because the line $h$ which intersects the axis of such cutting faces is inclined to the center of the spindle, and the cutting faces themselves are inclined in the same degree. Such inclination is apparent in the edge view of the cutter $e'$ shown in Fig. 2, where a much greater portion of the surface is visible upon the upper than upon the under side of the cutting faces.

The shaping cutters in the gang may be increased in number up to the point where their outer ends would overhang the inner portion of the cutter face which forms the points of the teeth, as such overhanging portion would deface the points of the teeth in the rotations of the cutter. Every point upon the periphery of the cutter necessarily revolves in a plane at right angles to the spindle $d$, as indicated by the dotted lines $n$ which are drawn at right angles to the axis of the spindle. The dotted lines $n$ are drawn adjacent to the flanks $b'$ of the teeth, and run inside the points $b^2$ of the teeth; so that the outer portion of the cutter face would have to overhang the inner portions in order to shape such flanks, and in its rotations past the points of the teeth would cut them off to the level of the line $n$. The number of cutters with inclined faces that can be combined in a single gang therefore depends upon the size and shape of the teeth and the size of the blank.

To facilitate the formation of the teeth upon the shaping cutters $e$, $e'$, they are preferably made independent of the spacing disks which are fitted to the spindle between the same, and such disks may be formed with cutting teeth $f^2$ upon their peripheries, as indicated in Fig. 5.

The edges of the disks, as shown at $f$ and $f'$ in Fig. 1, are inclined to their sides in correspondence with the curved surface of the blank, and thus serve to accurately form the tops of the teeth upon the desired curve.

The uncut portion of the blank at $a'$ is shown of slightly greater radius than the tops of the teeth, thus indicating the primary size of the blank; which is reduced, when cutting the teeth, to the desired radius; by the operation of the topping-cutters. The faces or edges of the cutters $f'$ are of greater angle than those of the cutters $f$, as they are set farther from the center of the gang. The cutter $f'$ may be dispensed with at one end of the gang, or both may be made of less thickness so that each will top off a part of the same tooth.

The topping cutter may be used with any class of gear cutter, as it would obviously perform the same function of topping off the teeth, and thus avoid the previous turning of the blank, upon its periphery. The topping-cutter also performs an additional function in correcting any error in the adjustment of the blank upon the arbor $j$, which not infrequently happens in cutting large numbers of gears. Where such errors arise and the blank is held out of center, the teeth are sometimes cut of greater depth upon one side of the blank than the other, and the tops of the teeth are not concentric with the bottoms of the spaces $c$. With the use of the topping-cutters, the tops of the teeth are necessarily made concentric with the bottoms of the spaces, and the teeth are thus made perfectly uniform in all their dimensions.

The cutters described herein may be used in forming spur teeth of any shape, as ratchet or locking teeth; as well as the spur gear teeth shown in the drawings. In any case, the formation of spur teeth requires the blank to be held stationary during the cutting of the teeth, and the cutter to be moved transversely across the rim of the blank; thus cutting away the metal from the spaces and leaving the teeth projecting outward upon the rim. Whatever the shape of the teeth, the use of such a series of cutters secures the same advantage in producing two or more teeth simultaneously instead of one. The cutters in the series would in all cases possess the same peculiarity, namely, that they would present a series of exactly similar cutting faces which would all be inclined in the same direction and at the same angle to a common curve, which would be represented by the periphery of a given blank, so as to form all the teeth of precisely the same shape and in the same relation to the center of the blank. Where the cutter and faces are of symmetrical shape as is required to form spur gear teeth, the axial lines of such symmetrical cutting faces would not only be inclined at the same angle to the same curve (namely, the periphery of the blank) but would necessarily all be inclined to the same center, namely, the center of the blank. The cutters would also, in such a series, always be of different diameters; as the parts of the spindle $d$ upon which they are fixed would necessarily be at different distances from the center of the blank. Such a series of cutters would be adapted to furnish at one cut two or more teeth upon a blank of given size, but would not be adapted to shape accurately more than one tooth upon a blank of any other size whatever, as the curvature of such blank would necessarily differ from that of the given size, and the locations of the different cutters upon the spindle and the inclination of their cutting faces to the periphery of the blank would therefore differ.

The series of cutters is shown in the drawings formed of separate pieces, with the topping-cutters also formed separately, and clamped between the shaping cutters upon the same spindle; as such a construction is preferable in actual practice; but the topping-cutters, one or more of them, may be made integral with one or more of the shaping cutters; or the whole series of annular cutters may be formed in a single piece, especially when intended to cut very small teeth.

We are aware that a hob for cutting a worm wheel has been formed with the thread of greater diameter at the ends than at the middle of its length and inclined toward the center of the blank; but such a spirally threaded cutter cannot be moved transversely to the blank, and the number of teeth formed at once upon the blank is not therefore increased by such construction. While a worm cutter operates successively with all its cutting faces upon all the teeth in the blank; the several cutting faces in our gang of cutters operate independently upon the blank, and each of them forms a separate tooth and thus adds to the aggregate capacity of the cutter.

We are aware that male and female cutters have been constructed to form the flank at first and the sides of the tooth outside of the pitch line afterward; but the topping cutter which we employ operates simultaneously with the cutters which shape the sides of the teeth. We hereby disclaim the construction referred to.

The shaping cutter and topping cutter shown herein form two circular cutting bits rotated in unison.

We disclaim a rotary cutter provided with two circular cutting bits adapted to rotate in unison, one of said bits conforming in shape to the curved sides of two teeth and the intervening base, and the other bit conforming in shape to the ends of the teeth whereby the teeth and intervening base may be shaped, dressed and finished at one operation. We have not claimed such invention broadly herein, as such device has been in public use more than two years prior to the date of our present application, and is not therefore patentable. We have therefore been able only to claim a specific form of the said topping cutter. Our claim to the topping cutter herein is therefore limited to the combination of a gang of shaping cutters having similar symmetrical faces with their axes inclined to the same center and a series of intervening topping cutters having their cutting faces formed at right angles with the said axes, so as to square off the tops of a series of teeth as the same are formed by the shaping cutters.

What we claim herein, and desire to secure by Letters Patent, is—

1. A series of annular shaping cutters adapted for cutting simultaneously two or more teeth of similar shape by a single transverse movement across the rim of a circular blank, the cutting faces of the several cutters being inclined in the same direction and at the same angle to a curve corresponding with the periphery of a given blank, as set forth.

2. A spindle provided with a gang of detachable annular shaping cutters, and with means for clamping the cutters upon the spindle, the cutters being adapted for cutting simultaneously two or more teeth of similar shape by a single transverse movement across the rim of a circular blank, and being formed with similar symmetrical faces, and such faces having their axial lines all inclined at the same angle to a curve corresponding with the periphery of a given blank, as set forth.

3. The combination, with a spindle, of a gang of detachable annular shaping cutters having similar symmetrical faces with their axial lines all inclined at the same angle to a curve corresponding with the periphery of a given blank, and a series of detachable topping cutters arranged between the said shaping cutters, with means for clamping the shaping cutters and topping cutters together upon the spindle, the whole being adapted to simultaneously shape, and finish the tops of, a series of similar teeth in a blank of circular form, substantially as set forth.

In testimony whereof we have hereunto set our hands in the presence of two subscribing witnesses.

ULRICH EBERHARDT.
FRED L. EBERHARDT.
HENRY E. EBERHARDT.

Witnesses:
   JOSEPH B. SHORT,
   THOMAS S. CRANE.